United States Patent Office 3,455,337
Patented July 15, 1969

3,455,337
IRRADIATED ARTICLE
Paul M. Cook, Atherton, Calif., assignor to Raychem Corporation, Redwood City, Calif., a corporation of California
No Drawing. Filed Oct. 31, 1966, Ser. No. 590,488
Int. Cl. F16l 9/12, 13/02
U.S. Cl. 138—178        24 Claims

ABSTRACT OF THE DISCLOSURE

This invention relates to a differentially irradiated crosslinked polymeric heat recoverable article having a unitary, one-piece wall containing a sufficient crosslink density near a first surface thereof to be substantially infusible and containing a gradual decreasing density of crosslinking throughout the thickness of said wall, and said wall being fusible and substantially non-crosslinked near the surface opposite said first surface. The article is formed by subjecting the article to a dosage of irradiation sufficient to provide a crosslink density in one portion of the article which renders it substantially infusible, but which is insufficient to render the opposite portion thereof substantially infusible.

---

This invention relates to novel crosslinked polymers, particularly to differentially crosslinked polymeric tubing capable of having the property of elastic memory imparted to it.

Specific industrial applications often require polymeric materials which partially possess the characteristics of a crosslinked system and partially possess the characteristics of a substantially non-crosslinked system such as those disclosed in Wetmore, U.S. Patent No. 3,243,211, which is incorporated herein by reference. For example, it is common practice to laminate an insulating covering over electrical components such as conductors. The insulating material must be securely bonded to the conductor in order to protect the conductor from water, air or other materials with which it may come into contact. It is also important that there be no void spaces between the covering and the conductor. The occurrence of void spaces is particularly troublesome where the insulating material is applied to an element having an irregular surface. Such difficulties are overcome by articles of the type described in the above Wetmore application because the fusible or substantially uncrosslinked portion thereof fuses and flows while the recoverable portion undergoes recovery thereby functioning as a bonding means for the recoverable portion and the substrate.

In one way already known to those skilled in the art, an insulating material having these general characteristics is prepared in a double extrusion process employing functional additives. More particularly, this procedure involves an outer layer of tubing which is crosslinked, and an inner layer which is not crosslinked. The original extruded tubing, destined to be the inner layer of the tubing, is composed of a low molecular weight polymer containing a high concentration of a radiation-absorbing compound, i.e., an antirad. The antirad acts under irradiation as a radical scavenger inhibiting crosslinking by competing with the radiation-induced radical reactions. The outer layer extruded over the original tubing is a high molecular polymer containing a polyfunctional monomer which readily promotes crosslinking. This double layered tubing, upon being irradiated, is substantially crosslinked at the outer portion, while the inner portion experiences negligible crosslinking. The double layered tubing may be rendered heat recoverable in conventional ways, e.g., those disclosed in Patent Nos. 2,027,962 and 3,086,242. When the tubing is placed around an electrical conductor, for example, and heat is applied, the inner portion becomes fluid while the outer recoverable portion undergoes recovery, thus urging the inner fluid portion toward the conductor to which the tubing thereby becomes bonded.

The method for making the tubing above-described has several disadvantages. First, since the inner and outer portions are of unlike composition, they must be separately compounded. The separately compounded batches must then be separately extruded. Moreover, the use of an antirad is an important ingredient in the preparation of the inner portion of tubing of this type. In contrast thereto, the present invention eliminates the need for separate compounding and extrusion operations, as well as dispensing with the use of an antirad. The present invention provides a novel tubing having fusible and infusible portions in a surprisingly simple and economical manner.

Accordingly, it is a principal object of my invention to provide a novel polymeric tubing which possesses both the characteristics of a crosslinked system and the characteristics of a non-crosslinked system.

More particularly, it is an object of this invention to provide a novel integral polymeric tubing which is differentially crosslinked, i.e., which is substantially crosslinked and substantially infusible in the outer portion of the tubing wall, but which contains a decreasing amount of crosslinking through its radial thickness and is substantially fusible and free of crosslinking in the inner portion of the wall. An infusible material is one which no longer flows at elevated temperatures, but rather contains a three-dimensional gel network and behaves elastically in the melt in contrast to fusible material which will melt and flow and has no network structure.

It is also an object of this invention to provide a novel heat recoverable tubing, tapes, sheet material, molded parts, etc.

Still another object of the present invention is to provide a heat recoverable tubing capable of being laminated or otherwise united with another body in such a manner that a secure, intimate and impervious bond is formed.

A further object of the p resent invention is to provide a heat recoverable tubing having elastic memory which is capable of being laminated or otherwise united with another article in such a manner that a secure, intimate and impervious bond is formed.

In a preferred embodiment of my invention, it is an object of the invention to provide a novel polymeric seamless tubing by subjecting the seamless tubing to irradiation and a dosage sufficient to render the outer portion substantially infusible while the inner portion remains substantially fusible.

These, and other objects of the invention will, it is believed, become apparent from the more detailed description which follows.

Briefly, the present invention comprehends a novel differentially crosslinked polymeric tubing having a tubing wall containing sufficient crosslink density in one portion to be substantially infusible and containing a decreasing density of crosslinking through its radial thickness and having an opposite portion which is substantially fusible and substantially non-crosslinked. Although the following description of the invention relates primarily to a tube having the higher crosslink density in the outer portion of its wall, the invention is equally applicable to tubing having an inner portion with a higher crosslinking density, a radially decreasing crosslinking density through the wall and an outer portion which is substantially fusible and non-crosslinked. The invention also includes the process for producing such tubing which generally comprises subjecting the tubing to irradiation of a type sufficient to provide a crosslink density on one portion of the tubing wall which renders it substantially infusible. The invention also encompasses heat recoverable articles characterized by being capable of changing dimensions in response to the application of heat at a given temperature, and the substantially fusible portion of which is capable of becoming fluid at said given temperature.

In general, the tubing utilized in the practice of this invention is a seamless material, and is formed in accordance with techniques well-known to those skilled in the art by molding, extruding, and the like.

In carrying out the process of this invention the tubing is exposed to irradiation such that the outer portion absorbs substantially all of the total incident irradiation while the inner portion remains essentially unaffected. This can be accomplished by the use of various types of irradiation including charged particles, i.e., $\beta$ and $\alpha$, neutral particles i.e., neutrons and electromagnetic, i.e., $\gamma$ and ultraviolet. The absorption behavior of these different types of irradiation in a material will vary and this must be taken account in practicing this invention. When charged particle irradiation penetrates a material the energy absorption after an initial high value falls off very rapidly. For charged particles the energy absorption in the material is dependent upon the nature and energy of the charged particle and the density and thickness of the material. Thus it is possible to alter the amount of energy absorbed per unit depth in a specific material by the proper selection of charged particles and energies. On the other hand, when electromagnetic radiation penetrates a material the energy absorption follows an exponential law such that in a given half thickness of a material, half of the original incident energy is absorbed, in the next half thickness one quarter of the original incident energy is absorbed, etc. Thus it is possible by the appropriate choice of electromagnetic radiation for a particular thickness of a material to absorb a substantial portion of the incident radiation in that portion of the material to be rendered infusible and still maintain a fusible portion. It can be seen that either neutral or charged particles, or electromagnetic radiation can produce differentially crosslinked articles in which one portion is rendered substantially infusible while the other portion remains substantially fusible.

The polymeric material for use in the production of articles in this invention is a heat recoverable material capable of having the property of elastic memory imparted to it. Any material capable of being crosslinked by high energy radiation such that it possesses the property of elastic memory may be utilized in the present invention. Typical heat recoverable materials include crosslinked polyolefins, e.g., crosslinked polyethylene; crosslinked polyvinyl halides, e.g., crosslinked polyvinyl chloride; crosslinked polyvinylidene halides, e.g., crosslinked polyvinylidene fluoride; crosslinked ethylene vinylacetate copolymers; crosslinked ethylene ethylacrylate copolymers; crosslinked polyamides; etc. The polymeric materials used in the practice of this invention may contain additives which enhance radiation crosslinking, plasticizers, fillers and other additives familiar to those skilled in the art.

Once the tubing has been differentially crosslinked, it is capable of having the property of heat recoverability imparted to it. This can be accomplished by several techniques. In one way, the differentially crosslinked tube can be heated by radiant heat, hot fluids or other means, and then subjected to a differential pressure between the inside and outside of the tubing; the amount of pressure being sufficient to cause the tube to expand in a controlled fashion. When the tube has reached the desired size and shape it is cooled. The cooling causes the reformation of strong interchain forces such as crystallinity which sets the tubing in the expanded state since at low temperatures these forces are stronger than those due to crosslinks. Reheating substantially weakens the interchain forces and the crosslink forces become dominant and the tubing recovers to its original crosslinked geometry. Alternately the property of heat recoverability may be imparted by plastically deforming the differentially crosslinked tubing at temperatures at which the interchain forces are still appreciable in magnitude. This can be accomplished by the application of a substantial amount of pressure which can be acquired mechanically or hydraulically. The tube will then retain this shape and can be recovered elastically by heating to a temperature which will substantially weaken the interchain forces leaving the crosslinks to force the tubing to assume its original crosslinked geometry. In any event, the tubing that is prepared is heat recoverable so that at any time, the tubing may be shrunk to approximately its original diameter simply by the application of heat. As has been indicated, the heat recoverability of the tube is of great value in the covering of wires, cables and the like. The heat recoverable tubing may be simply slipped over the wire or cable and then shrunk by heat to provide a snug-fitting covering.

The manner of irradiating polymeric tubing to achieve the differentially crosslinked product of this invention is illustrated in the following examples, which should not be regarded as limiting in any way.

Both polyethylene and a plasticized polyvinyl chloride tubing were differentially irradiated by exposing the tubing to high energy electron irradiation. The polyethylene tubing had an outside diameter of 193 mils, an inside diameter of 136 mils, and an approximate wall thickness of 28 mils. The polyvinyl chloride tubing had an outside diameter of 224 mils, an inside diameter of 154 mils and an approximate wall thickness of 35 mils. The irradiation source was an 0.8 mev. electron beam. Since this beam energy would have rendered these particular tubings crosslinked throughout, it was necessary to reduce the maximum energy of the electrons. This was accomplished by wrapping a calculated thickness of aluminum foil on the tubing such that the maximum energy of the electrons emerging from the inside of the aluminum foil and entering the polymeric tubing was approximately 0.2 mev. This resulted in the outer portion of the tubing receiving substantially all of the incident radiation while the inner portion remained substantially unchanged. The average amount of irradiation deposited in the polyethylene tubing was determined by the calculation of the transvinylene absorbance in the infrared at 10.35 microns. Decane was used to reduce the surface interference of the polyethylene film during spectrophotometric readings. The average dosage received by the polyvinyl chloride tubing was determined by the above mentioned polyethylene dosimetry assuming that the energy absorption in polyvinyl chloride is approximately the same as in polyethylene. After irradiation the tubing was examined for differential crosslinking by the following tests:

1. The average dose on the outer and inner layer of the tubings was determined by transvinylene absorbance measurements.

2. The elastic modulus measurements at elevated temperatures were performed lengthwise on the entire tubing. Measurements were made at 150° C. for polyethylene since this temperature is well above the crystalline melting point of this polymer and at 175° C. for polyvinyl chloride since at this temperature uncrosslinked polyvinyl chloride has essentially zero strength.

3. The flow of the inner wall was carried out in accordance with specification RT-1301, paragraph 4.3.2 as follows:

Three six-inch specimens of tubings were conditioned for three minutes in a 200° C. oven. Within five seconds after removal from the oven, approximately ¼ inch of one end was lightly pressed together with a pair of needle nose pliers. Only pressure sufficient to completely close the opening was used. The specimens were then removed from the pliers, allowed to cool to room temperature for a period of ten minutes. The specimens were then placed back in the 200° C. oven for a period of five minutes. After this heating period the specimens were removed from the oven and allowed to cool to room temperature and examined for openings through the pressed portion. Those specimens which contained no openings were considered to have passed this test.

4. The memory tests were conducted by heating the irradiated tubing above the melt temperature, expanding with a hand mandrel and cooling while in the expanded state. The materials were then reheated to permit recovery.

The results of these tests are indicated in the following table.

TABLE.—RESULTS OF DIFFERENTIALLY IRRADIATED TUBING

| Example No. polyethylene | Aluminum foil thickness (mils) | Avg. dose on outer portion (mrads) | Avg. dose on inner portion (mrads) | Avg. elastic modulus at 100% elongation and 150° C. (p.s.i.) | Inner wall flow test | Expansion memory test |
|---|---|---|---|---|---|---|
| 1 | 32.7 | 15 | ≈2 | 46 | Failed | Not tested. |
| 2 | 40.3 | 27 | <1 | 33 | Passed | Do. |
| 3 | 40.3 | 16 | <1 | 25 | do | Passed. |

| Example No. polyvinyl chloride | Aluminum foil thickness (mils) | Avg. dose on outer portion (mrads) | Avg. dose on inner portion (mrads) | Avg. elastic modulus at 100% elongation and 150° C. (p.s.i.) | Inner wall flow test | Expansion memory test |
|---|---|---|---|---|---|---|
| 4 | 40.3 | 100 | ≈10 | 308 | Failed | Failed. |
| 5 | 40.3 | 40 | ≈2 | 127 | do | Passed. |
| 6 | 42.0 | 4 | <1 | 42 | Passed | Do. |

As will be immediately apparent to those skilled in the art, the reverse of the procedure described in the examples can be done by crosslinking the inside of the tube, deforming it by reducing its diameter, and subsequently, upon heating, expanding to bond to the object inside of which it has been placed. The main unique feature of all the above results from the differential crosslinking by irradiation.

Among the numerous and varied uses to which the article of the present invention may be put are the joining of two or more pieces of metal, and/or plastic, joining two or more pieces of tubing or rod combinations thereof, the application of casters to chairlegs, the sealing of bottle caps or covers on other containers, forming moisture-resistant coverings on one or more objects, forming a chemically resistant covering for one or more objects and lamination in general. Furthrmore, the article of the present invention may be used for splicing, encapsulating, etc., electrical elements.

It will be readily apparent to those skilled in the art that the present invention is not restricted to tubing or any other particular shape. In general, the process of the present invention can be used to crosslink many kinds of shaped articles. It can be used to produce heat shrinkable articles or merely to crosslink articles such as wire, sheets, molded and shaped articles, etc. In general, the invention is applicable to any articles which have a relatively fusible portion and a relatively infusible portion.

I claim:

1. A differentially irradiated crosslinked polymeric heat recoverable article having a unitary, one-piece wall containing sufficient crosslinked density near a first surface thereof to be substantially infusible and containing a gradual decreasing density of crosslinking throughout the thickness of said wall and said wall being fusible and substantially non-crosslinked near the surface opposite said first surface.

2. The article of claim 1 wherein said article comprises a polyolefin.

3. The article of claim 1 wherein said article comprises polyethylene.

4. The article of claim 1 wherein said article comprises polyvinyl chloride.

5. The article of claim 1 wherein said article comprises polyvinylidene fluoride.

6. The article of claim 1 wherein said article comprises an ethylene-vinylacetate copolymer.

7. The article of claim 1 wherein said article comprises an ethylene-ethylacrylate copolymer.

8. The article of claim 1 wherein said article comprises a polyamide.

9. A heat recoverable differentially irradiated crosslinked polymeric tubing having a unitary, one-piece wall containing sufficient crosslinked density near a first surface thereof to be substantialy infusible and containing a gradual decreasing density of crosslinking through the radial thickness of said wall and said wall being fusible and substantially non-crosslinked near the surface opposite said first surface; said tubing being capable of changing its dimensions in response to the application of heat at a given temperature and said fusible surface being capable of becoming fluid at said given temperature.

10. The tubing of claim 9 wherein said tubing is an integral tubing.

11. The tubing of claim 9 wherein said tubing in polyolefin tubing.

12. The tubing of claim 9 wherein said tubing is a polyethylene tubing.

13. The tubing of claim 9 wherein said tubing is a polyvinyl chloride tubing.

14. The tubing of calim 9 wherein said tubing is a polyvinyl fluoride tubing.

15. The tubing of claim 9 wherein said tubing is an ethylene-ethylacrylate copolymer tubing.

16. The tubing of claim 9 wherein said tubing is an ethylene-vinylacetate copolymer tubing.

17. The tubing of claim 9 wherein said tubing is a polyamide tubing.

18. A method of producing a differentially irradiated heat recoverable crosslinked polymeric article which comprises subjecting the article to a dosage of irradiation sufficient to provide a crosslinked density in one portion of the article which renders it substantially infusible, but which is insufficient to render the opposite portion thereof substantially infusible.

19. The method of claim 18 wherein the article is a tubing and the change in crosslink density is in a radial direction.

20. The method of claim 19 wherein said tubing is an integral tubing.

21. The method of claim 18 wherein said article comprises polyolefin.

22. The method of claim 18 wherein said article comprises polyethylene.

23. The method of claim 19 wherein said article comprises polyvinyl chloride.

24. A method of producing a differentially irradiated heat recoverable crosslinked polymeric article which comprises subjecting the article to a dosage of irradiation sufficient to provide a crosslinked density in one portion of the article which renders it substantially infusible, but which is insufficient to render the opposite portion thereof substantially infusible; and dimensionally changing the article from its original heat stable form to an independently dimensionally heat unstable form.

References Cited

UNITED STATES PATENTS

| | | | |
|---|---|---|---|
| 3,191,005 | 6/1965 | Cox | 138—178 X |
| 3,243,211 | 3/1966 | Wetmore | 285—21 X |
| 3,343,568 | 9/1967 | Branscum et al. | 138—178 |

PATRICK D. LAWSON, Primary Examiner

U.S. Cl. X.R.

285—21